United States Patent
Sudano et al.

(10) Patent No.: US 8,272,808 B1
(45) Date of Patent: Sep. 25, 2012

(54) DEVICE AND METHOD FOR THE PLUGGING OF SERVICES IN CONDUITS

(75) Inventors: Anthony Sudano, Laval (CA); Michael Davison, Brossard (CA); Benoît Côté, Otterburn Park (CA)

(73) Assignee: Sanexen Environmental Services, Inc., Varennes, Quebec (CA)

( * ) Notice: Subject to any disclaimer, the term of this patent is extended or adjusted under 35 U.S.C. 154(b) by 0 days.

(21) Appl. No.: 13/473,680

(22) Filed: May 17, 2012

Related U.S. Application Data

(63) Continuation of application No. 12/544,320, filed on Aug. 20, 2009, now Pat. No. 8,197,158.

(60) Provisional application No. 61/090,606, filed on Aug. 20, 2008.

(51) Int. Cl.
*F16L 55/18* (2006.01)

(52) U.S. Cl. .................................................. 405/184.1

(58) Field of Classification Search .................. 405/184, 405/184.1, 184.4; 221/279, 198, 244, 280, 221/310; 138/89, 90
See application file for complete search history.

(56) References Cited

U.S. PATENT DOCUMENTS

| | | | |
|---|---|---|---|
| 4,648,454 A | 3/1987 | Yarnell | |
| 4,951,758 A | 8/1990 | Sonku et al. | |
| 5,318,395 A | 6/1994 | Driver | |
| 5,368,423 A | 11/1994 | Hanna | |
| 5,384,086 A | 1/1995 | Smith | |
| 5,501,248 A | 3/1996 | Kiest | |
| 5,511,333 A | 4/1996 | Farrell | |
| 6,056,016 A | 5/2000 | Rogers | |
| 6,887,014 B2 | 5/2005 | Holland | |
| 7,028,716 B2 | 4/2006 | Kaneta et al. | |
| 2002/0058121 A1 | 5/2002 | Mercier | |
| 2004/0156682 A1* | 8/2004 | Blackmore et al. | 405/184.1 |
| 2008/0012241 A1 | 1/2008 | Norman et al. | |
| 2009/0229161 A1 | 9/2009 | Austin | |

FOREIGN PATENT DOCUMENTS

| | | |
|---|---|---|
| CA | 2361960 | 5/2002 |
| FR | 2651925 A3 | 3/1991 |

\* cited by examiner

*Primary Examiner* — Sunil Singh
*Assistant Examiner* — Kyle Armstrong
(74) *Attorney, Agent, or Firm* — Reed Smith LLP

(57) ABSTRACT

A plug for a tubular service entrance of a conduit, wherein the plug includes a core body having a central hollow channel extending from a first end to second end of the core body; at least one flexible fin extending radially outwardly from the core body and having an outer diameter greater than the inner diameter of the tubular service entrance so that the plug is adapted to fit tightly into the tubular service entrance, and wherein the at least one flexible fin is deformable to adapt to the shape of the service entrance and apply a lateral force against the inner diameter of the service entrance. A plug dispensing magazine for storing and dispensing service entrance plugs to be service entrances of a conduit prior to installation of a liner in the conduit and a method of sealing the service entrances.

11 Claims, 9 Drawing Sheets

DEVICE AND METHOD FOR THE PLUGGING OF SERVICES IN CONDUITS

CROSS-REFERENCE TO RELATED APPLICATION

This application is a continuation under 35 U.S.C. §120 of U.S. application Ser. No. 12/544,320 filed on Aug. 20, 2009, the entire disclosure of which is hereby incorporated by reference herein, which claims the benefit under 35 U.S.C. §119 (e) of the earlier filing date of U.S. Provisional Application Ser. No. 61/090,606 filed on Aug. 20, 2008, the entire disclosure of which is also hereby incorporated by reference herein.

FIELD OF INVENTION

The invention relates to the rehabilitation of underground small diameter potable water distribution conduits as well as large diameter watermains.

BACKGROUND OF THE INVENTION

Trenchless methods are known for the rehabilitation of sewer and potable water conduits. Known methods include cured-in-place-piping (CIPP) and pulled-in-place-piping (PIPP), the major difference between the two applications being internal pressure. CIPP is achieved by producing a composite tube that is inserted or inverted into a host pipe. The composite is cured inside the host pipe to activate a resin system to produce a solid composite lining inside the pipe. An example of CIPP is disclosed in U.S. Pat. No. 5,384,086, this disclosure of which is incorporated by reference herein. Another method is disclosed in Canadian Patent #2 361 960 (US 2002/0058121) entitled "A Tubular Liner and Method of Rehabilitating of Conduits", this disclosure of which is incorporated by reference herein. There is, however, a need for improved installation devices and methods to increase product quality, installation reliability, and execution efficiency.

SUMMARY OF THE INVENTION

An embodiment of the invention provides improved installation devices and methods related to the lining of the inner surface of an underground potable water conduit. In accordance with an embodiment of the invention, a non-protruding, polymeric finned plug which is inserted into a protruding, partially protruding, non-protruding, or even in a saddle service. The plug is inserted entirely within the service or hole leaving the face of the service or hole available and without interference to the liner and its polymeric resin so as a leak-tight bond may be formed. The absence of any plug lip or shoulder assures that no foreign matter remains entrapped between the liner/polymeric resin combination and the service or inner wall of the host pipe. This minimizes the possibility of entrapped air around the service face and host pipe which could lead to liner delamination after the service is opened and the water pressure is re-established in the water conduit. This aspect is directed specifically to product quality.

An embodiment of the invention also covers an improved leak-tightness of the service plugging operation. When the polymeric flexible multileveled finned plug is inserted into a service, the oversized fins flex and deform to conform to and apply a constant external force against the lateral inner wall of the service or hole creating a leak-tight seal of the service. The multiple levels of fins add additional layers of leak-tight protection.

An embodiment of the invention also addresses the loading and dispensing of the above described polymeric finned plugs. Where long conduits with numerous services entrances are involved, which is often the case on residential and commercial streets, the total time required to plug all services within the entire conduit is comprised of the time to load the plugging device and plug each service plus the time required to move the plugging equipment into position for each service. If the plugging equipment needs to be pulled out of the conduit to load a plug onto the plugging device, this lengthens the total time required to complete plugging of all services in a conduit. The invention addresses pre-loading a large quantity of plugs onto a magazine which is mounted on the plugging device. By pre-loading numerous plugs into the magazine and introducing the plugging equipment and loaded plug magazine avoids the need to pull the plugging device out of the conduit to load a plug onto the plugging device between each service plugging operation. The mounted magazine and dispensing mechanism must be sufficiently small to fit into conduits of small diameter as is often the case in potable water distribution conduits.

DETAILED DESCRIPTION OF THE INVENTION

Figure 1A:
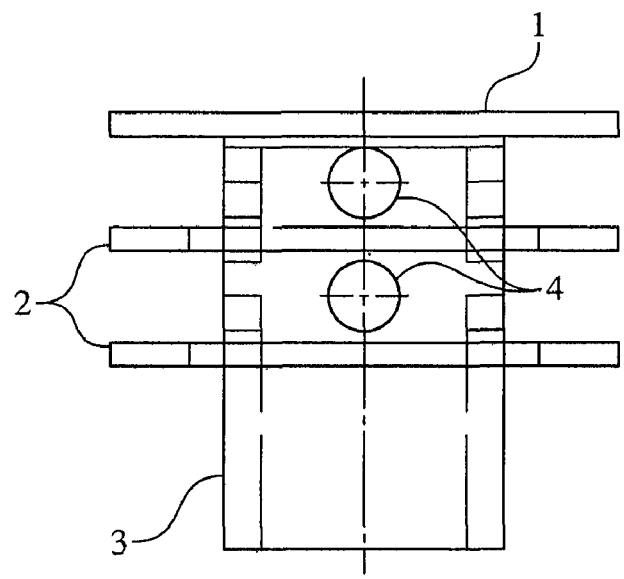
FIG. 1A is an elevational view of a polymeric flexible finned plug used to render service entrances leak-tight against polymeric resin from the liner according to an embodiment of the invention.
Figure 1B:
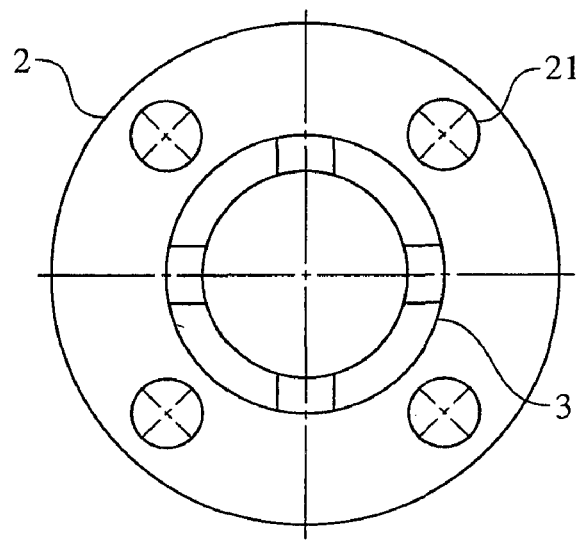
FIG. 1B is a plan view of the plug of FIG. 1A.

FIGS. 1A and 1B refer to an embodiment of the invention which is a plug 1 made of polymeric material such as polyethylene, polypropylene, polyurethane, polyamide, and synthetic rubbers or other polymeric or rubberized material which is relatively rigid and approved by a recognized authority for use in potable water application. Plug 1 is inserted in a pipe service entrance prior to lining the pipe in order to keep uncured resin from the lining process from infiltrating and thus clogging the service entrance. The plug 1 has a core body 3 and at least one thin flexible fin 2 extending therefrom. The core body 3 may contain radial vent holes 4 and the at least one thin flexible fin 2 may contain longitudinal vent holes 21 for a function to be described in a later embodiment. The fins 2 are of a diameter slightly larger than the nominal diameter of the service entrance at its time of installation. Since the fins 2 are flexible and have memory, during the insertion of the plug 1 into the service entrance, the fins 2 flex and deform as the plug 1 is inserted into the service, however, the fins' 2 material memory will want to return to their original configuration except for some plastic deformation. The oversized flexible fins 2 will apply a constant lateral force against the inner wall of the service entrance thus allowing for sealing the service entrance. In the illustrated embodiment, in order to increase certainty and reliability that the service entrance is leak-tight, fins 2 are multi-layered with at least two layers of fins 2 longitudinally spaced about core 3. With each fin 2 being flexible and at various heights within the service, various service diameters and surface conditions are accommodated sealed at each fin 2. This provides for extra levels of leak-tightness within a compact plug design.

The plug 1 configuration and its features as described in embodiments of the invention will accommodate variations in service entrance diameter and surface finish found at the time of conduit rehabilitation, which can vary greatly from case to case due to reasons such as age, quality of valve construction, quantity and quality of water having passed through the service entrance over its time of use since entry into service, and other such factors. The described features of the oversized, flexible, multi-leveled fins 2 shall serve to maximize the number of cases whereby one plug design will satisfy the largest possible service entrance configurations of a given nominal diameter.

The plug 1, which is inserted into the service entrance prior to conduit lining, allows the face of the service entrance be clear of any obstructions so that the polymeric resin and liner may form a clean, strong, and homogeneous bond with the face of the service entrance or inner wall of the conduit in the case where the service entrance is not penetrating beyond the inner wall of the conduit.

Embodiments of the invention apply not only to services which are protruding through an inner face of a conduit but also to services which are either; a) tapped into a conduit but the face of the plug is even or within the inner wall of the conduit, or b) the service is supported by a saddle or conduit joining union whose inner diameter is nominally equal to the outside diameter of the host pipe(s). In this case, a hole is present in the host pipe approximately in-line with the axis of the service entrance being supported by the saddle or union. This plug 1 design allows for it to be inserted entirely within the service and thus not protruding the service within the conduit. The added advantage of this as opposed to a plug design which protrudes within the conduit is that when the liner is installed in a subsequent operation, the liner and its resin have virtually no opportunity to have air bubbles or pockets entrapped at the interface between the liner and the plug 1.

Figure 2A:
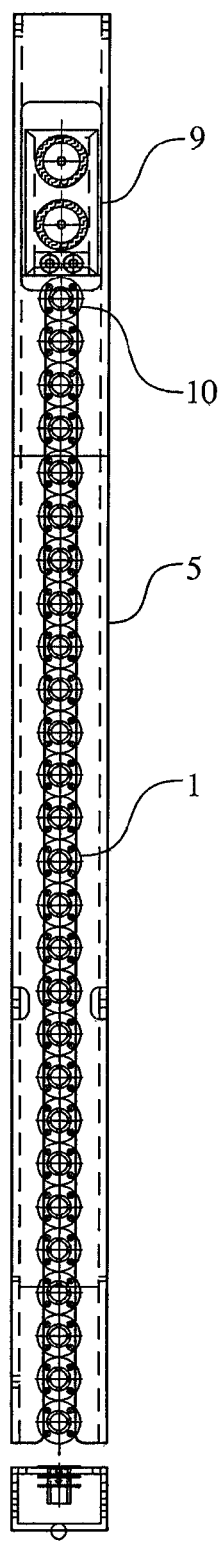
FIG. 2A is a plan view a plug magazine according to an embodiment of the invention with high plug loading capacity with spring-loaded pusher forcing the plugs to advance through the magazine as they are stripped away individually for use.
Figure 2B:
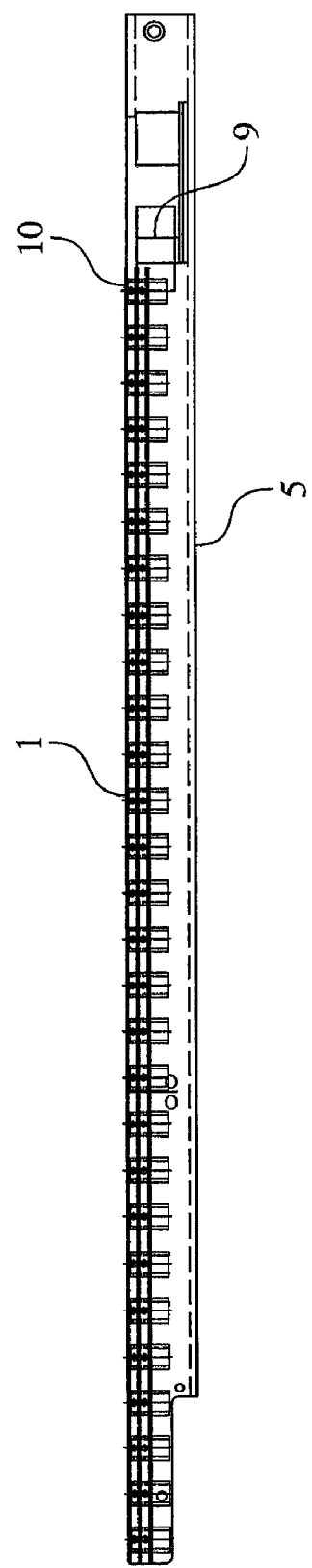
FIG. 2B is an elevational view of the plug magazine of FIG. 1A.

FIGS. 2A and 2B refer to another aspect of the invention which is the high loading capacity and distribution magazine 5 for the above described flexible finned polymeric plugs 1. Water mains to be rehabilitated are typically long and the preparation work to be performed prior to lining, notably the service plugging operation, must be accomplished from within the conduit. Embodiments of the invention reduce operation time, increase efficiency by minimizing the number of times that the equipment sent into the conduit be pulled out to load with plugs. Embodiments of the invention include a preloaded plug distribution magazine 5 with a large number of plugs 1, ideally enough to cover the number of service entrances in the conduit is required and is the basis for the invention.

Figure 9:
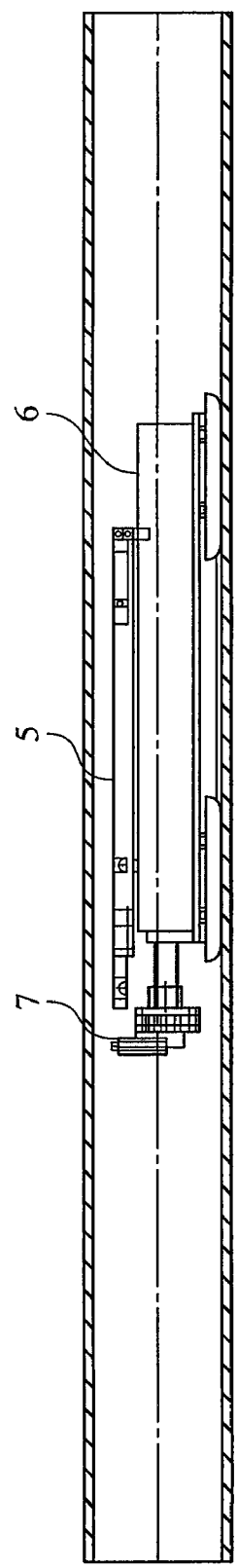
FIG. 9 shows an elevational view depicting a plug dispensing magazine according to an embodiment of the invention mounted on commercially available robot.

Referring to FIG. 2, it is shown that a long, spring-loaded magazine 5 or track capable of being loaded with several plugs 1. The plug dispensing magazine 5 is designed to be able to be retrofitted directly onto commercially available equipment 6 (FIGS. 4 and 9) specific for conduit rehabilitation. Examples of commercially available equipment such as remotely controlled robots are disclosed in U.S. Pat. Nos. 4,648,454; 5,318,395 and 5,368,423, the disclosures of which are incorporated by reference herein. In order for the plug insertion equipment to work properly, the force required to advance a plug 1 into position after one has been removed by the plug insertion tool 7 (FIG. 7) should be constant. In the invention, this is assured by a constant force biasing member or spring 23 activating a plug pusher 9. As well as applying a constant force, the utilized spring has a very long stroke. This allows for a magazine 5 to be quite long and having a loading capacity of many plugs 1.

The cross sectional profile of the magazine 5 or track is shaped in such a manner as to support the plugs 1 in between two levels of fins 2. This assures that the plug 1 are always presented to the plug strip-off point at the same level.

Figure 3:
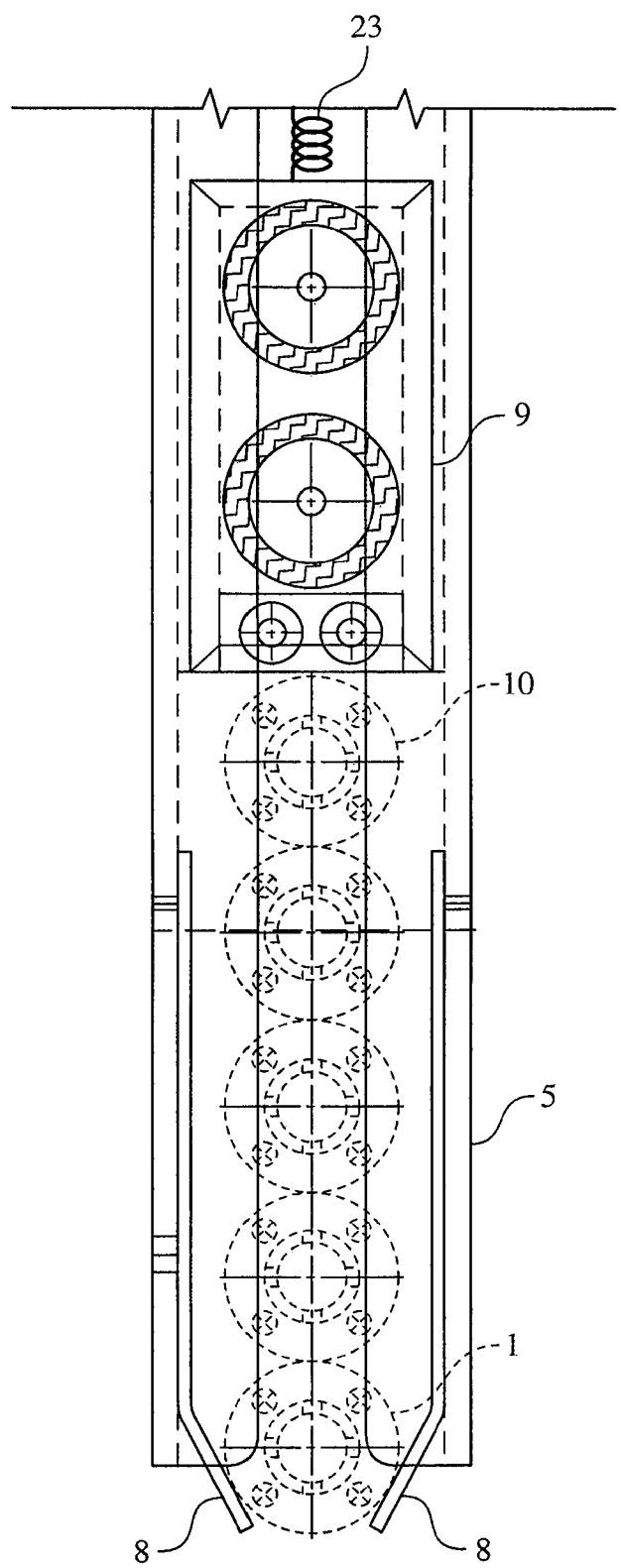
FIG. 3 is a plan view of the plug magazine plug dispensing system according to an embodiment of the invention showing the spring-loaded retaining fingers used to hold back the series of plugs in the magazine.

At the front end of the magazine 5 is a set of spring-loaded plug retaining fingers 8 (FIG. 3) which have a higher spring force than the plug advancement force. This keeps the plugs from being pushed through. The spring-loaded retaining finger(s) 8 can be singular or dual. They are made from a flexible material such as spring steel, and angled to hold back the plugs 1 in the magazine 5. The plug insertion tool approaches the plug 1 in position ready to be stripped off from underneath the plug 1. The plug insertion tool engages the waiting plug 1 and then moves forward, thereby forcing the retaining fingers 8 to spread open and allow the plug 1 to be stripped from the magazine 5. Concurrently, the constant force plug advancing pusher 9 moves the next plug 1 into position ready for the next cycle. The pusher 9 acts on the trailing plug 10 of the series and thus the entire series of plugs 1 advances.

Referring again to FIG. 9, it can be seen that due to the plug dispensing magazine's low profile, it can be mounted directly onto a commercially available robot 6 used for rehabilitating small diameter conduits and still fit.

Figure 10:
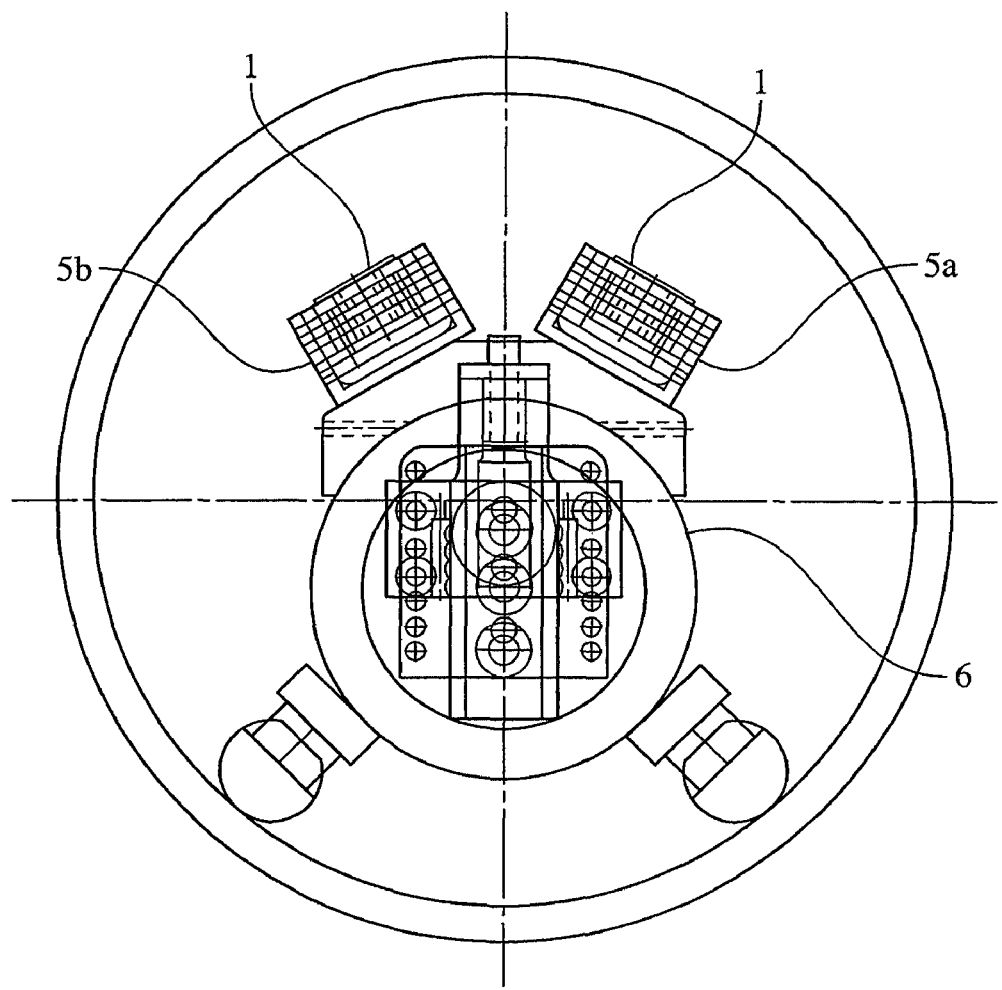
FIG. 10 an end view of an embodiment of the invention having mounting multiple plug dispensing magazines onto a commercially available robot.

FIG. 10 refers to the possibility of mounting multiple plug dispensing magazines 5 onto a commercially available robot 6. By offsetting the plug dispensing magazines 5a, 5b angularly, it is possible to mount more than one magazine on the robot 6. This allows for the possibility of either multiplying the total number of plugs 1 which can be pre-loaded prior to sending the equipment into the conduit or for having more than one size of plugs such that once the equipment inside the conduit, the operator, who is operating the equipment remotely, can plug service of various sizes without the need to withdraw the equipment from the conduit to change the size of plugs in the magazine 5. Again the purpose of this is to minimize the time required to plug the services and thus increasing operation efficiency.

Figure 4:
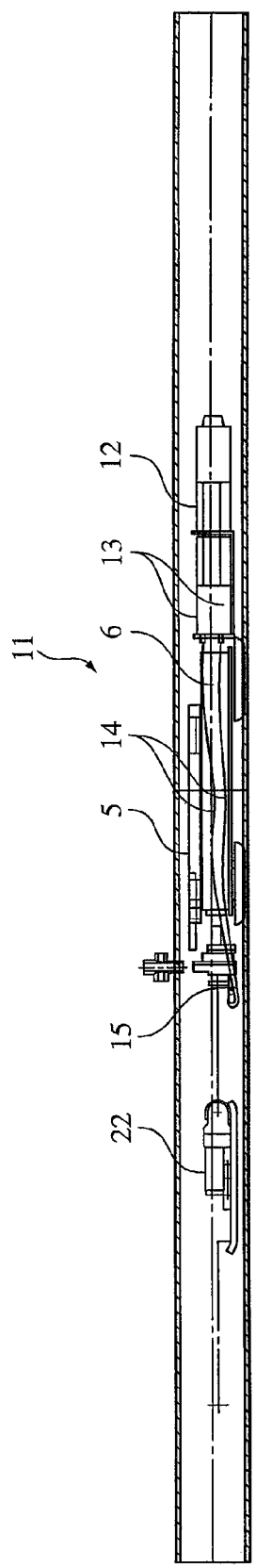
FIG. 4 is an elevational view of a conforming material dispensing system assembly according to an embodiment of the invention.

Yet another aspect of the invention is directed at plugging service entrances against resin infiltration during the lining process when service entrances are irregular in shape to the point whereby a usual plug 1 cannot guarantee leak-tightness. FIG. 4 shows a conforming/sealing material dispensing system 11 comprising later described elements 12, 13, 14 and 15 mounted on commercially available equipment 6 designed and built for rehabilitation of small diameter potable water conduits. With rigid, semi-rigid, or even multi-level flexible-finned plugs 1 as described earlier, there exists cases where a service entrance, either a service tapped directly into the host pipe or a service entrance made up of a valve in a saddle, is of a shape and/or surface finish which is not round enough or smooth enough in finish allowing for a leak-tight seal by the plug 1. In these such circumstances, the invention provides for injecting a material which lends itself to injection, fills gaps between the plug 1 and the service entrance wall, approved for contact with potable water, and cures to a hardness allowing for it to be drilled out after the lining process along with the plug itself.

Figure 5:
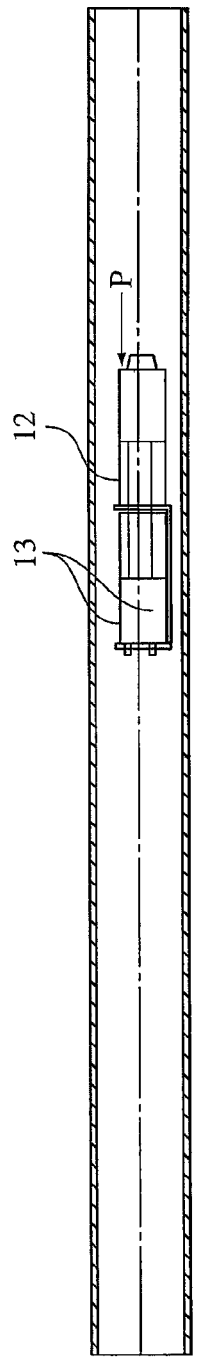
FIG. 5 is an enlarged view of the conforming/sealing material pneumatic, remote actuated dispenser according to an embodiment of the invention including the single or multi-part sealing material.
Figure 6:
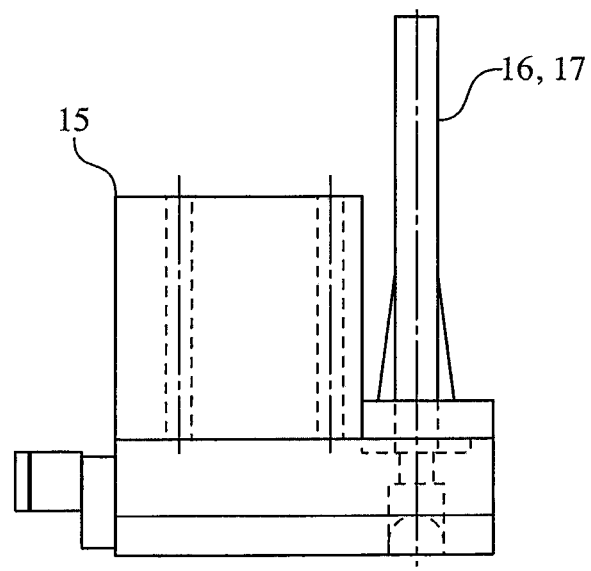
FIG. 6 is an enlarged elevational view of the compact, right-angle conforming/sealing material dispensing valve according to an embodiment of the invention including a multi-element static mixing nozzle used to mix multi-part material.
Figure 7:
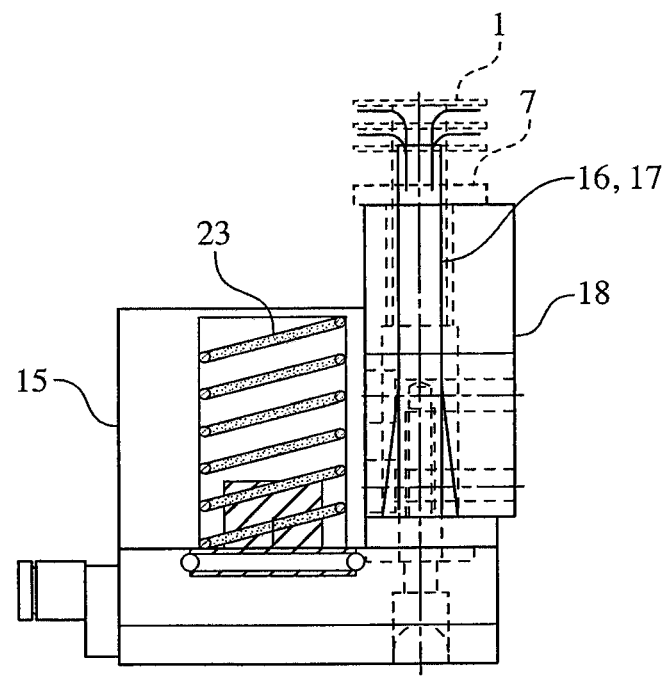
FIG. 7 is an enlarged elevational view of the compact, right-angle conforming/sealing material dispensing valve according to an embodiment of the invention depicting the compact size and appropriate angular configuration between the inlet of the dispensing valve and the outlet of the conforming/sealing material through the static mixing nozzle nested within the plug insertion tool and capable of injecting the material once the plug is installed in the service without having to change equipment or position.
Figure 8:
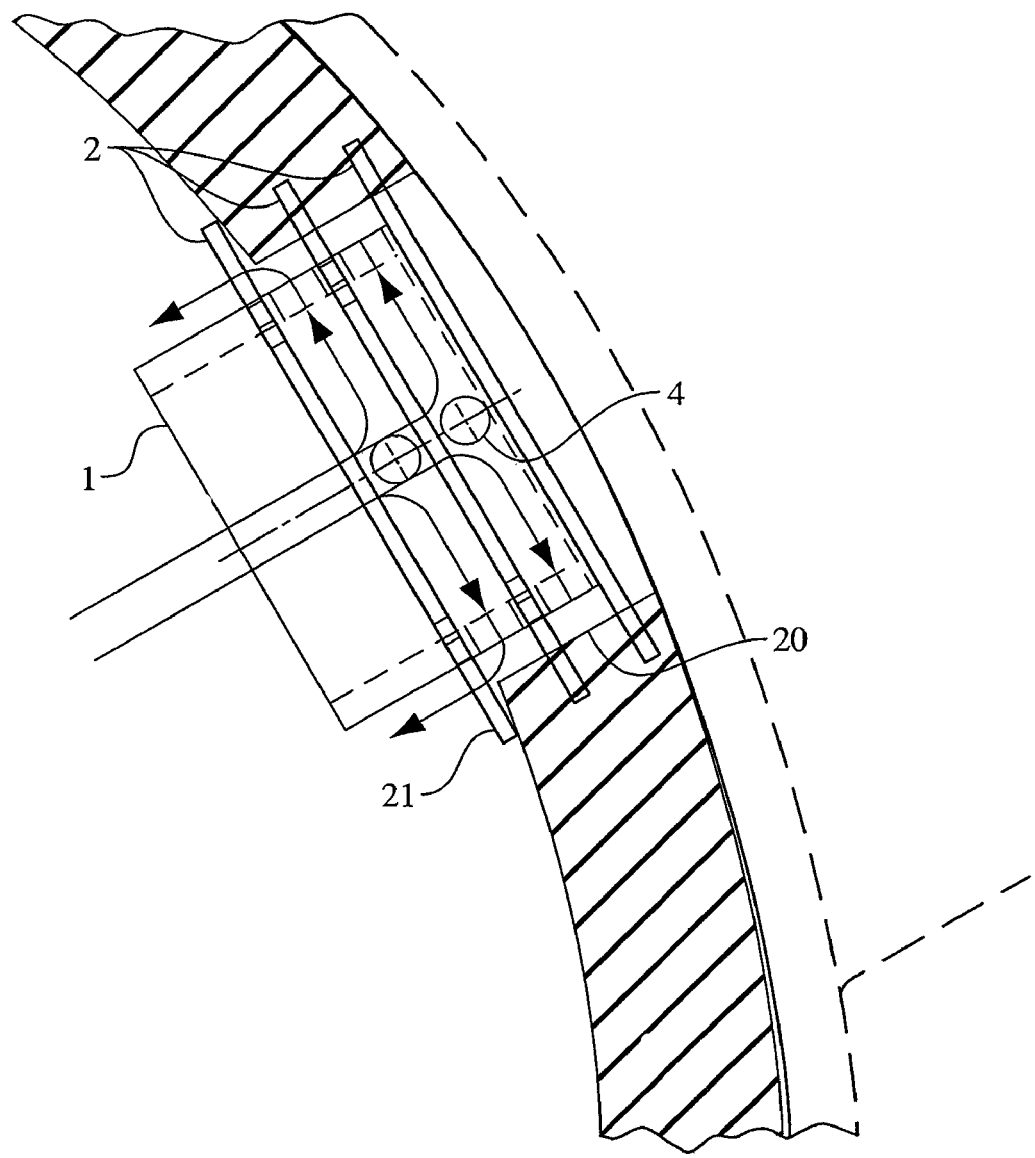
FIG. 8 shows an assembled view of the polymeric flexible-finned plug positioned within an irregular shaped hole whereby the service is installed in a saddle on the outer face of the pipe.

Embodiments of the invention include a pneumatic remote operated injection device 12, a cartridge of single or multi-part conforming/sealing material 13 (FIG. 5), a single or plurality of flexible hoses 14 for delivering the conforming/sealing material 13, a remote operated dispensing valve 15 to control the moment at which the conforming/sealing material 13 is required, a static mixer 16 required for mixing multi-part conforming/sealing material. The sum of the above stated components is mounted on a commercially available robot 6 designed for performing plugging, drilling and inspection within small diameter potable water conduits and the like. The dispensing valve 15 (FIG. 6) is designed and constructed to be able to fit within small diameter potable water conduits. It is pneumatically operated and can be actuated remotely. Its inlet and outlet are angled at 90 degrees for a compact arrangement. A nozzle 17 with if necessary a static mixer 16 is fixed onto the dispensing valve 15. The static mixer 16 is required in the case where multi-part conforming/sealing materials are used. FIG. 7 shows the dispensing valve 15 mounted onto the plug insertion tool support block 18 along with the plug insertion tool 7 and a plug 1 which would previously have been stripped from the plug dispensing magazine 5. The conforming/sealing single or multi-part material arriving from the dispenser arrives under pressure via flexible tubes (not shown). At the operator's discretion, the dispensing valve 15 is opened and the single or multi-part conforming/sealing material flows through the dispensing valve 15 and through the nozzle 17 which is equipped with or without a static mixing element 16 required for multi-part sealing materials. The nozzle 17 passes through an opening within the plug insertion tool support block 18 and plug insertion tool 7. If the service entrance was deemed to be of irregular shape or of unsmooth finish prior to the insertion of the plug 1, once the plug 1 is inserted into the service entrance, the operator triggers a dosed shot of conforming/sealing material. The conforming/sealing material passes through the central channel of the plug 1 (FIG. 8) then out through radial vent holes 4 in the plug 1 to fill the gaps between the flexible multilevel fins 2, the inner wall 20 of the service or hole and the outer core of the plug. Longitudinal vent holes 21 through the lower fins 2 allow for air which was trapped between the fins 2 to escape so the conforming/sealing material can fill all the voids and conform to the inner wall 20 of the service entrance regardless of its shape and/or surface finish and adhere to all the walls and seal the service entrance rendering it leak-tight. Longitudinal vent holes 21 in the lowest flexible fin 2 allow for some of the conforming/sealing material to escape providing the operator with evidence, via the camera 22, that the conforming/sealing material has been injected in sufficient quantity. Should there not have been enough conforming/sealing material injected to fill the gaps and ooze through the longitudinal vent holes 21 of the lowest flexible fin 2, then the operator can trigger a supplemental shot of material. This is repeated until the operator sees the material ooze out the lowest fin 2. In order to contain the conforming/sealing material and from keeping it from infiltrating into the inner side of the service entrance, the topmost, or leading flexible fin 2 along with the top portion of the plug 1 are continuous without longitudinal vent holes 21 or openings. This also allows for a front line defense against leaks or at the very least keeps the possible path for resin infiltration to a minimum, thus reducing the size of the possible paths for the resin to travel.

If not otherwise stated herein, it may be assumed that all components and/or processes described heretofore may, if appropriate, be considered to be interchangeable with similar components and/or processes disclosed elsewhere in the specification, unless an express indication is made to the contrary.

If not otherwise stated herein, any and all patents, patent publications, articles and other printed publications discussed or mentioned herein are hereby incorporated by reference as if set forth in their entirety herein.

It should be appreciated that the apparatus and methods of the invention may be configured and conducted as appropriate for any context at hand. The embodiments described above are to be considered in all respects only as illustrative and not restrictive.

What is claimed is:

1. An apparatus for plugging a plurality of service entrances in a conduit prior to installation of a liner in the conduit, the apparatus comprising:
   a remotely controlled robot;
   at least one plug dispensing magazine mounted on the robot for storing and dispensing a plurality of service entrance plugs; each plug having a core body having a central hollow channel, at least two longitudinally spaced apart flexible fins extending radially outwardly from the core body and a plurality of radial vent holes located in between the longitudinally spaced apart flexible fins;
   each magazine supporting the plugs at a constant height and comprising: at least one spring-loaded retaining finger for retaining the plugs at a plug strip-off end of each magazine; a plug pusher for advancing the plugs along the magazine; and a biasing member for applying a constant force against the plug pusher to advance the plugs;
   a plug insertion tool having a support block for engaging and removing a plug from the plug strip-off end of each magazine and for inserting the plug into a service entrance of the conduit; and
   a remote operated injection device for delivering a sealing material into the plug inserted into the service entrance, the injection device including a nozzle located within the support block of the plug insertion tool, a remote controlled dispensing valve connected to the nozzle, and a cartridge of sealing material connected to the dispensing valve.

2. The apparatus of claim 1, wherein the injection device further comprises a static mixer connected to the nozzle.

3. The apparatus of claim 1, wherein the injection device is pneumatically operated.

4. The apparatus of claim 2, wherein the sealing material is a multi-part sealing material.

5. The apparatus of claim 1, comprising two or more plug dispensing magazines mounted onto the remotely controlled robot.

6. The apparatus of claim 5, wherein each of the two or more plug dispensing magazines are pre-loaded with the same sized plug to allow for a greater capacity of plugs for conduits having a very large number of service entrances of the same size within the conduit.

7. The apparatus of claim 5, wherein each of the two or more plug dispensing magazines are pre-loaded with different sized plugs to accommodate different sized service entrances within the conduit.

8. The apparatus of claim 1, wherein the biasing member of each magazine is a spring applying a constant force to the pusher to advance the plugs down the magazine as they are being released.

9. The apparatus of claim 1, wherein the at least one spring loaded retaining finger at the plug strip-off end of each magazine has a retaining force greater than the plug advancing force of the biasing member to keep the plugs from being pushed through.

10. The apparatus of claim 1, wherein the at least one spring loaded retaining finger includes two retaining fingers.

11. The apparatus of claim 1, wherein the at least one spring loaded retaining finger is made of flexible spring steel.

\* \* \* \* \*